(12) United States Patent
Wang et al.

(10) Patent No.: US 9,305,106 B1
(45) Date of Patent: Apr. 5, 2016

(54) OPEN WEB ARCHITECTURE AND GADGET WORKBENCH FOR CYBER SITUATIONAL AWARENESS AND METHOD THEREFOR

(75) Inventors: Haiqin Wang, Redmond, WA (US); Jai Joon Choi, Sammamish, WA (US); Peter John Stackle, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 137 days.

(21) Appl. No.: 13/184,483

(22) Filed: Jul. 15, 2011

(51) Int. Cl.
*G06F 7/00* (2006.01)
*G06F 17/00* (2006.01)
*G06F 17/30* (2006.01)
*G06F 17/50* (2006.01)

(52) U.S. Cl.
CPC .... *G06F 17/30893* (2013.01); *G06F 17/30082* (2013.01); *G06F 17/50* (2013.01)

(58) Field of Classification Search
None
See application file for complete search history.

(56) References Cited

U.S. PATENT DOCUMENTS

| | | | | |
|---|---|---|---|---|
| 6,889,196 | B1 * | 5/2005 | Clark | 705/7.12 |
| 8,290,943 | B2 * | 10/2012 | Carbone et al. | 707/724 |
| 8,489,646 | B2 * | 7/2013 | Abramson et al. | 707/802 |
| 8,645,175 | B1 * | 2/2014 | Arbogast | 705/7.11 |
| 2003/0061225 | A1 * | 3/2003 | Bowman et al. | 707/100 |
| 2005/0060647 | A1 * | 3/2005 | Doan et al. | 715/514 |
| 2006/0092467 | A1 * | 5/2006 | Dumitrescu et al. | 358/1.15 |
| 2007/0118844 | A1 * | 5/2007 | Huang et al. | 719/330 |
| 2008/0046471 | A1 * | 2/2008 | Moore et al. | 707/104.1 |

OTHER PUBLICATIONS

Bain, B. (Jun. 3, 2010). New DOD cyber commander seeks better situational awareness. Retrieved from Federal Computer Week: http://fcw.com/articles/2010/06/03/web-alexander-remarks-csis.aspx.
Ben Bain, "New DOD cyber commander seeks better situational awareness", http://fcw.com/articles/2010/06/03/web-alexander-remarks-csis.aspx, Jun. 3, 2010, 2 pages, Federal Computer Week.
"Core Impact Pro Overview", http://www.coresecurity.com/content/core-impact-overview, retrieved on Jul. 15, 2011, 4 pages, Core Security Technologies.
Jason Miller, "DoD has limited cyber situational awareness", http://www.federalnewsradio.com/?sid=1972480&nid=35, Jun. 4, 2010, 2 pages, Federal News Radio.
Mica R. Endsley, "Toward a Theory of Situation Awareness in Dynamic Systems", 1995, 33 pages, 37(1), 32-64, Human Factors and Ergonomics Society.
Broadbent, "Perception and Communication," Applied Psychology Unit of the Medical Research Council, Cambridge, Pergamon Press, Ltd., 1958, 352 pages.

(Continued)

*Primary Examiner* — Jau-Shya Meng
(74) *Attorney, Agent, or Firm* — Hanley, Flight & Zimmerman, LLC

(57) ABSTRACT

A design and implementation of open web architecture for cyber situational awareness is disclosed herein. The architecture is user-centric, web-based and service-oriented to increase the flexibility of user dashboard and utilization of third-party provided information and web services. A method disclosed herein includes accessing a gadget workbench including a workflow to be executed by a web gadget. The method also includes interacting a data source with the workflow, interacting an analysis module with the workflow, and interacting a visualization module with the workflow. The method further includes generating the web gadget based on the data source, the analysis module and the visualization module.

32 Claims, 5 Drawing Sheets

(56) References Cited

OTHER PUBLICATIONS

Cisco, "Cisco Security Advisories," [http://www.cisco.com/warp/public/146/news_cisco/data/syndication/rss2/SecurityAdvisories_20.xml], accessed on Jun. 4, 2015, 4 pages.
The Eclipse Foundation, "Eclipse SDK," [http://www.eclipse.org/], accessed on Jun. 4, 2015, 4 pages.
Google, "Get Started Writing Gadgets," [https://developers.google.com/gadgets/docs/gs?csw=1], accessed on Jun. 4, 2015, 2 pages.
Nagios Enterprises, "Nagios," [https://www.nagios.org/], accessed on Jun. 4, 2015, 2 pages.
NMAP, "NMAP," [http://nmap.org], accessed on Jun. 4, 2015, 3 pages.
National Vulnerability Database, "National Vulnerability Database," [https://nvd.nist.gov/download/nvd-rss.xml], accessed on Jun. 4, 2015, 7 pages.
SmartGWT, "Smart GWT," [https://code.google.com/p/smartgwt/], accessed on Jun. 4, 2015, 3 pages.
Snort, "Snort," [https://www.snort.org/], accessed on Jun. 4, 2015, 5 pages.
The Apache Software Foundation, "Apache Tomcat," [http://tomcat.apache.org/], accessed on Jun. 4, 2015, 2 pages.
United States Computer Emergency Readiness Team, "US-CERT," [https://www.us-cert.gov/], accessed on Jun. 4, 2015, 2 pages.
Christensen et al., "Web Services Description Language (WSDL) 1.1," [http://www.w3.org/TR/wsdl], accessed on Jun. 4, 2015, published on Mar. 15, 2001, 33 pages.
WSO2 Inc, "WSO2 User Engagement Server," [http://wso2.com/products/user-engagement-server/], accessed on Jun. 4, 2015, 3 pages.
Google, "Google Web Toolkit," [http://code.google.com/webtoolkit/], accessed on Jun. 4, 2015, 3 pages.
Google, "Google Visualization API Reference," Google Visualization API, 2010, 75 pages.
Google, "GWT," Google Web Toolkit, 2010, 4 pages.

* cited by examiner

OPEN WEB ARCHITECTURE AND GADGET WORKBENCH FOR CYBER SITUATIONAL AWARENESS AND METHOD THEREFOR

FIELD

The present disclosure generally relates to a service oriented architecture design and implementation and more particularly, relates to a user-centric, service oriented architecture design and implementation for cyber situational awareness.

BACKGROUND

Over the last two decades, explosive applications of computing devices and networks occurred due to exponential increase in computing power and telecommunications. The Internet and web services are being quickly embraced into business services, military operations and even social life of ordinary people. During the same time, information system exploitation and compromises have grown from a novice hobby to the choice of targets by organized crime groups and nation/state sponsored adversaries. Companies and agencies have faced denial-of-service and other kinds of attacks and loss of proprietary data worth millions of dollars.

The dangerous combination of known and unknown vulnerabilities, strong adversary capabilities, and the high impact of cyber attacks makes cyber security a critical problems and top management priority in most organizations and agencies. The sophisticated and fast evolving cyber attacks can come from virtually any corner of the cyber space anytime, initiated by curious high school student hackers, well-organized cyber crime gangs, or even nation states. Cyber security solutions are sought after to ensure the networked systems operate properly and to protect sensitive data from being stolen or abused. Cyberspace Situational Awareness (CSA) becomes an indispensible component of cyber security solutions due to the complex operational environments. Having a complete, insightful, accurate and timely CSA is essential for decision makers to take preventative defense or proactive offense against cyber threats and provide fight-through capabilities for critical domains and applications.

Situational awareness is the perception of environmental elements within a volume of time and space, the comprehension of their meaning, and the projection of their status in the near future for decision superiority. In cyber security domain, situational awareness involves being aware of the current cyber situation, why and how the current situation was caused, the impact of the cyber attack, the intent of the attackers, how the situation evolved, and assessing plausible future situations. This requires analysis of low-level data, such as network traffic, and high-level events and contextual information such as mission goals and their dependency on cyber assets. Cyber security data is inherently of large volume, with adversarial noise, in heterogeneous format, and from different sources in decentralized locations. The complexity, scalability, and uncertainty of issues can make cyber situational awareness extremely overwhelming for human analysis. Many techniques and tools are developed to help automatically detect intrusions and adapt network configurations such as firewall settings. However, there is not a common open framework that can bring these available tools and modules together to provide a unified view of different utilities for CSA to end users' individual dashboards based on their own needs and cognitive preferences.

Gadget technology is adopted to allow web service oriented open architecture and individualized dashboard for cyber situational awareness. Gadgets are miniature objects offering dynamic web content that can be embedded on a web page by syndication. Users can add and customize gadgets to their own business and personal web site for individual use.

Workflow based Gadget Workbench (WGW) is designed for rapid gadget authoring which includes gadget creation, deploying, and sharing. Within the workbench accessible from any web browser, users can define a workflow from data source to analysis modules to visualization forms with simple drag-and-drop interaction. The workbench automatically generates gadgets based on the workflow definition. With a single click, the authorized users can publish the gadgets into a Gadget Repository for reuse, sharing, and knowledge retention.

SUMMARY

The disclosure is generally directed to a method for generating a web gadget which is carried out by the steps of selecting a data source from a plurality of data sources; filtering the data source based on pre-selected criteria; analyzing the filter data; and displaying a result of the analysis.

In another embodiment, the disclosure is directed to a system for generating a web gadget which includes means for identifying the presenting data to a user; means for selecting and presenting filters to the user; means for identifying and presenting visualizations to the user; means for selecting and presenting analysis modules to the user; means for selecting one of the data sources, one of the filters, one of the analysis modules and one of the visualizations by the user; and means for filtering the selected data, performing the selected analysis on the selected data and displaying a result of the analysis by the selected visualization.

DETAILED DESCRIPTION

Figure 1:
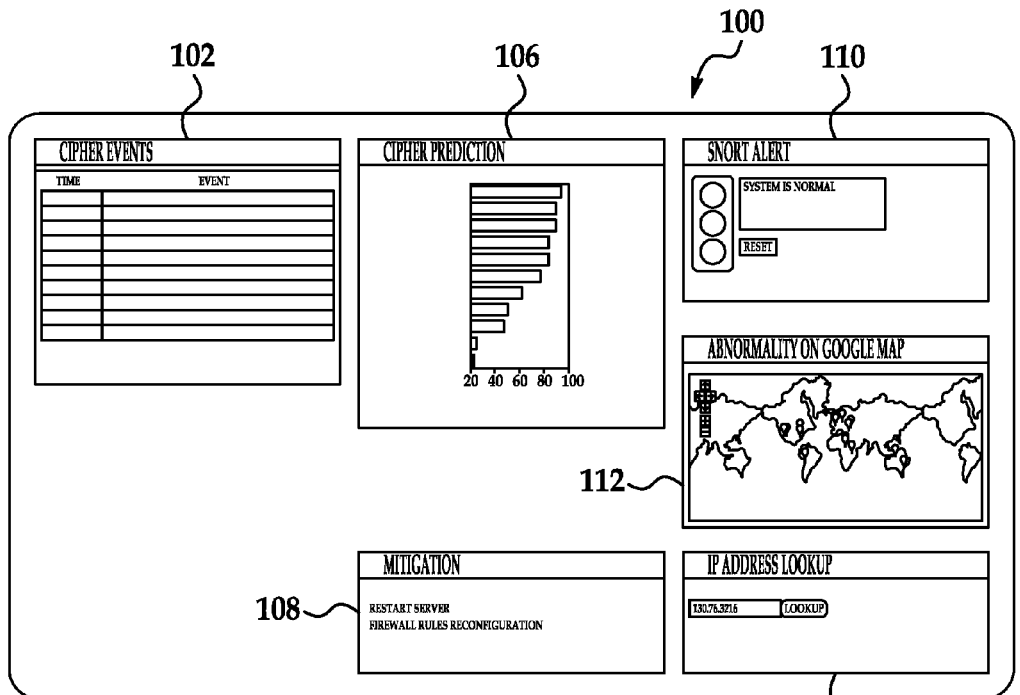
FIG. 1 is an example of a visualization-board according to the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

The features, functions and advantages that have been discussed can be achieved independently in various embodiments of the present disclosure or may be combined in yet other embodiments further details of which can be seen with reference to the following description and drawings.

The present disclosure discloses web-based user-centric, service-oriented, open architecture for cyber situational awareness. Being user-centric, the architecture allows users to tailor their own dashboards to bring the right information in their preferred presentation forms for intuitive visualization. Being web-based the architecture allows users to access their dashboards anywhere anytime from any web browser independent of their computing platforms. Being open the architecture allows users to utilize private gadgets not only from their enterprise, but also public gadgets available from third-parties. Being service-oriented the architecture allows users to reuse and share their own gadgets with great agility and flexibility.

A workflow based gadget workbench (WGW) 500 is developed for rapid gadget authoring which includes gadget creation, deploying and sharing. Within the workbench accessible from any web browser, users can define a workflow from data source to analysis modules to visualization forms with simple drag-and-drop interaction. The workbench automatically generates gadgets based on the workflow definition. With a single click, the authorized users can publish the gadgets into a Gadget Repository for reuse, sharing, and knowledge retention.

The design and implementation of the CSA architecture and the Gadget Workbench is described in the following sections.

Traditionally, situational awareness is brought to users' end by a common web portal with portlets rendered in a static layout. It is up to the portal authors decision regarding to what contents to be included in the portal web page, what format of visualization to be used to present information to be used to present information to end users, what layout to be used to render portlets in the portal web page. Users do not have much choice to customize the portal's content, visualization, and layout.

However, different users have a need to see different information in different ways. For example, a cyber security analyst at an IT command center needs to see the traffic patterns through a number of critical network systems and monitor the security alerts reported by Intrusion Detection Systems (IDS) and Intrusion Prevention Systems (IPS). On the other hand, a system administrator needs to see the network topology picture and what applications are running on the network nodes and their security patch versions. The different needs for information drive the different content of individual dashboards. And the end users, depending on their roles and tasks assigned, need to customize their individual dashboards to bring the right information to their eyes to enhance their own awareness of a relevant situation.

In addition, individuals have different cognitive style to think, perceive, remember, and reason about information. They have their preferred approach to information processing. A visualization form preferred by one user may not be intuitive to another. Therefore, the common web portal preferred by the portal designer may not be visually effective to some end users. Allowing end users to select their own information presentation form based on their own cognitive style will make the content of their web site more engaging and useful.

Referring initially to FIG. 1 which shows an example dashboard 100 for a Cyber security analyst that monitors the real-time cyber security events, the predicted emergent events 102 for the next ten minutes time window with the probability of occurrence 106, the highlights of intrusion detection and prevention alerts 110 for an enterprise, reported by an IDS/IPS named SNORT®, for example. It also shows some utilities to explore more information about IP address 104 and geographical location 112 of the cyber events.

For instance, in visualizing dashboard 100, block 102 displays a list of real-time cyber security CIPHER® events, pulled from an computer infrastructure and perimeter event repository, namely, CIPHER®, for example; block 104 provides IP address lookup tool that shows the IP address of a domain, from which country it originates; block 106 shows prediction of event occurrence with corresponding probabilities; block 108 displays a list of mitigation steps; block 110 shows an alert status as indicated by red, yellow or green lights; and block 112 is a location map showing the locations of the normal.

More and more tools for aiding cyber security analysis are available in forms of gadgets that provide dynamic syndicated web content as an embedded component in a web page. Examples include various IP address lookup tools that show the IP address of a domain, from which country it originates and other information. Instead of users' going to individual web sites to use these tools for information discovery, the present invention open web architecture allows users to bring these tools through gadgets to their own web dashboards and see the information directly from there. With the open web architecture, users can conveniently utilize many available tools provided by third parties, together with their own proprietary tools developed specifically for their own enterprise use.

The gadget technology is adopted to allow web service oriented open architecture and individualized dashboard for situational awareness. Gadgets are miniature objects offering dynamic web content that can be embedded on a web page by syndication. Users can add and customize gadgets to their own business and personal web site for everyday use. Gadgets have gained great popularity in recent years. Thousands of web gadgets providing various functions and cool visualizations have been developed by numerous enterprises and individuals. Some software tools even support web-oriented gadgets to be added to a computer's desktop.

Figure 2:
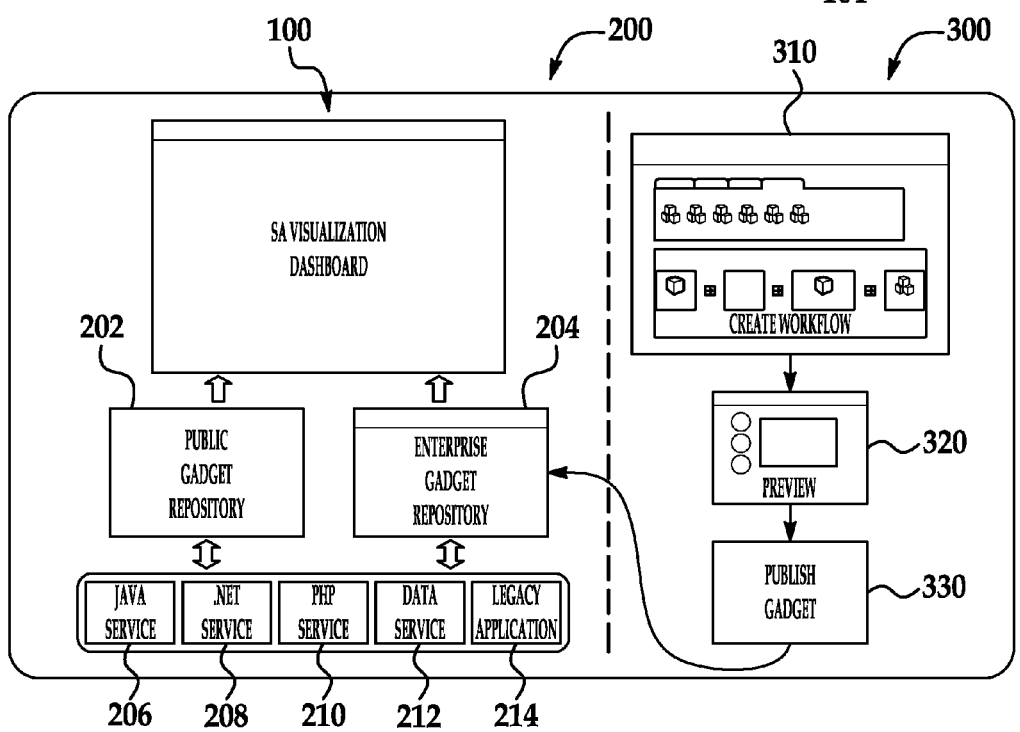
FIG. 2 is an example of the present disclosure open web architecture.

An open web architecture 200 for cyber situational awareness is shown in FIG. 2. In the figure, The Public Gadget Repository 202 is the common storage place for publicly accessible gadgets. Google® has one of the most popular repositories for gadgets published by Google® and numerous contributors. The Enterprise Gadget Repository 204 is the proprietary storage place for domain-specific gadget utilities with restricted access. Regardless of difference in access permission and storage place, the common feature of gadgets is that they can be developed in any web programming language, e.g., Java® service 206, NET® service 208, PHP service 210, on any computing platform e.g., Data Service 212 and Legacy Application 214, and hosted in any servers in web cloud. These differences are transparent to end users who utilize and syndicate gadgets for their own purpose.

When no gadgets are available to meet a user's need, the user may create his or her own gadget. While there are not currently any development tools to support automatic gadget authoring, a workflow-based gadget workbench 300 that requires no coding from users to create a gadget is developed. The workbench 300 provides a preview for the user to see the outcome based on the workflow created. The workbench 300 also creates the gadget description 310 automatically to make the gadget ready for publishing 330. The authorized users can publish the gadget into a corresponding gadget repository 204 with a single click without any coding in XML®, HTML®, or JavaScript®.

Figure 3:
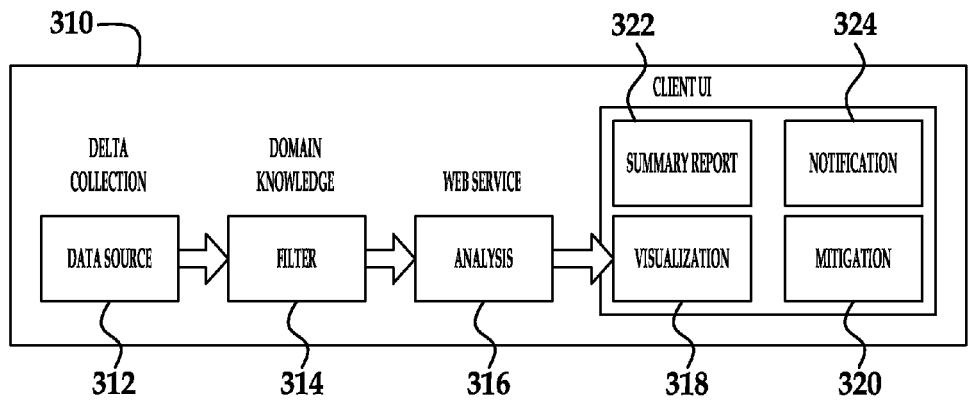
FIG. 3 is an example of a workflow functional blocks of the present disclosure.

A workflow 300 is shown in FIG. 3, which specifies data source 312, analysis modules 316, and visualization 318 forms in execution sequence. It starts with the data source specification which includes where to access that data, what format the data is represented, and what part of data is to be used for analysis. For example, users can specify the data source 312 to be enterprise computing infrastructure and network security monitoring event repository, CIPHER® and its JDBC® programming interface for accessing data by the subsequent analysis modules. Users can also specify the data source to be some system monitoring logs such as NAGIOS® (NAGIOS) textual log, or NMAP® (NMAP) vulnerability scanning report for analysis. Threat mitigation actions repository can also be specified as data source in case of analysis for Course of Actions (COA) analysis 437 for cyber defense and offense.

The analysis modules 316 process the data and generate analysis results for visualization 318. The analysis can be as simple as database query to show the real-time events. Complicated analysis can be used through web service applications. For example, we developed geographical location mapping from IP address that shows where the current security events are happening in Google Earth® visualization. The analysis module can be accessed through web service 316 and results can be embedded into clients' web pages. We also developed data mining and machine learning modules for automatic event dependency discovery and event prediction. They are all provided as web service and accessible through web and delivered to clients' web pages via gadgets 330.

There can be filtering process 314 before the data source 312 feeds data into analysis modules 316, so that uninterested data can be ignored and only data of interest to pass through for further analysis. For example, CIPHER® data 410 includes all cyber security events across all world-wide sites of a company. A security analyst in the Seattle area may be only interested in watching those events in Washington State. He or she can then set a geographical range filer 314 that only allows the events in this area to be passed down in the workflow to analysis module. This filtering module allows the analysts to be focused on the interested data. It also helps reduce the data volume greatly from data server to analysis web service applications.

The analysis results need to be presented to client users in certain user preferred forms, usually in graphical visualization charts for intuitive interface. But they can be as simple as textual summary reports 322 or email notifications 324. They can also be in much more complicated forms such as intelligent COA recommendation 437 for threat mitigation.

Figure 4:
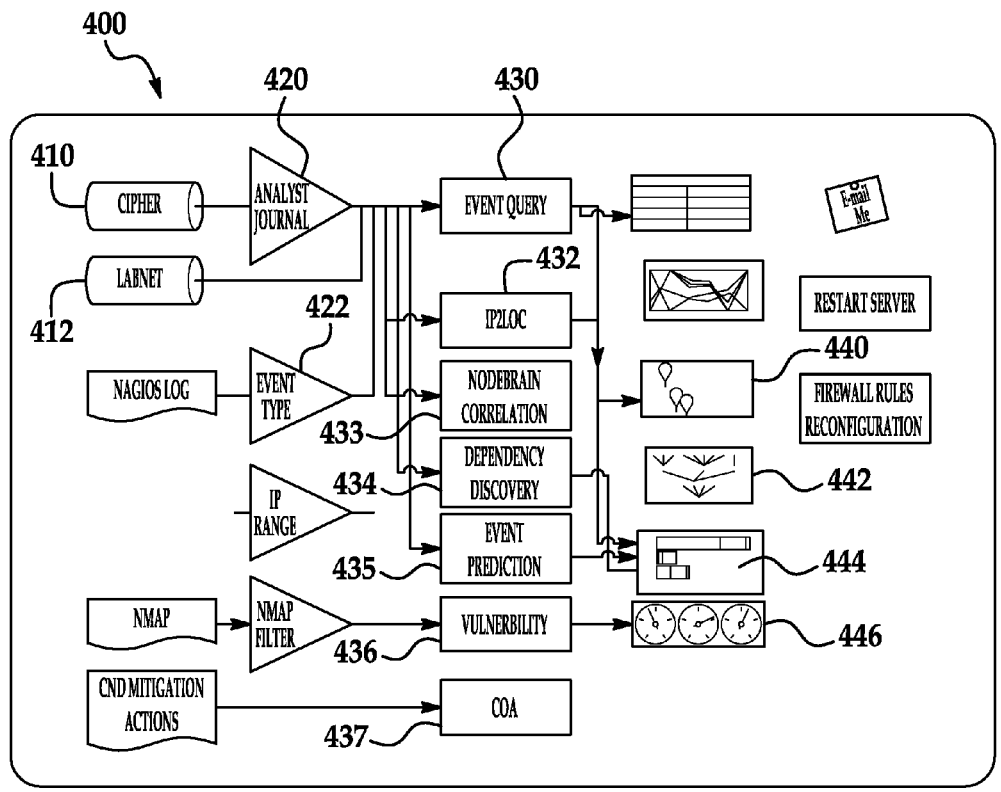
FIG. 4 is an example of the various components for the workflow blocks shown in FIG. 3.

As shown in FIG. 4, a workflow 310 composed of a data source module 312, a filter modules 314, an analysis module 316, and a visualization module 318. The data source module 312 can be composed of but not limited to NAGIOS Log® 410, NMAP® 412. The filter module can be composed of but not limited to Event Type® 422, NMAP® filter 424. The analysis module can be composed of but not limited to Event Query® 430, Vulnerability® 436. The visualization module can be composed of but not limited to gauge view 446, map view 440, bar chart 444. This composite workflow-based approach to gadget authoring allows customized gadgets specification to meet different users' needs. It provides great flexibility and functionality to gadget development.

The interface between these workflow building blocks are unified so that different modules know the input format they get and output their results in the expected format for the subsequent workflow block modules to use. The same format as Google's Visualization API was adopted and used in two-dimensional data tables with rows and columns for data representation expected by visualization modules. A Data Table object has properties to describe its data type, and optionally, data ID and data label. A Data View object can be used to conveniently hide and reorder rows and columns for visualization without modifying the underlying data (Google Visualization API). On the other hand, analysis modules use XML to describe their input and output data formats. They are implemented as web services and their interface can be described generally as Web Service Description Language (WSDL), or in RPC interface definition in Google Web Toolkit (GWT).

Figure 5:
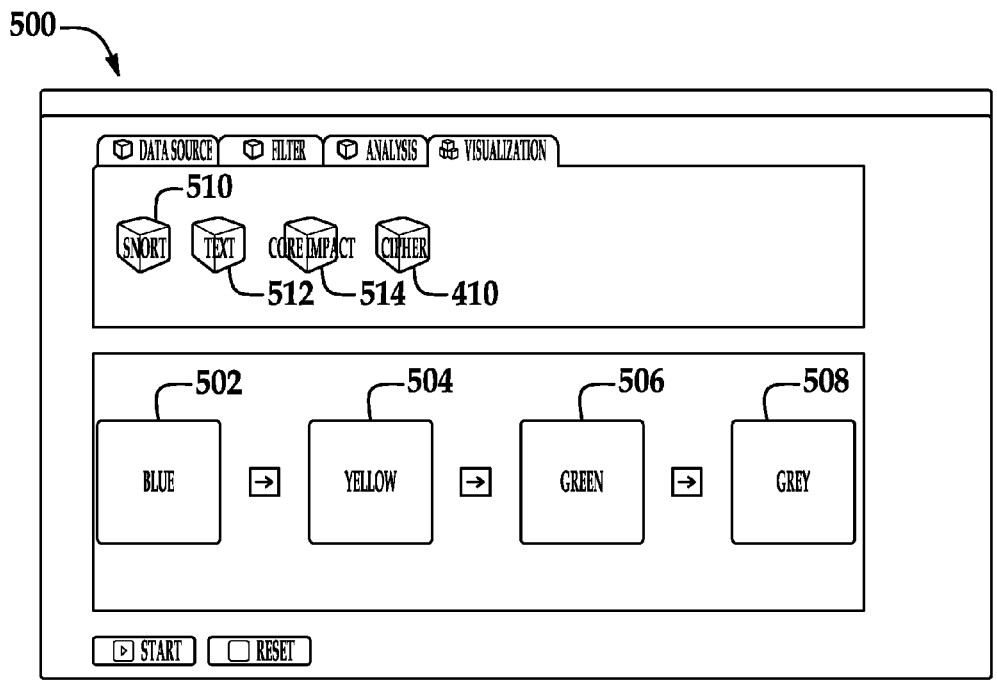
FIG. 5 is an example of a gadget workbench of the present disclosure.

FIG. 5 shows a screenshot of the Gadget Workbench 500. In the center of the screen, four blocks, colored in blue 502, yellow 504, green 506 and gray 508 respectively, indicate the four work blocks that need user's specification to create a workflow. The blue block 502 is for data source specification 312, which accepts only the data source pieces (colored blue and positioned under DataSource tab). When the DataSource tab is selected, users can drag any of the blue pieces into the blue work block 502 to specify the data source. The data source pieces 312 shown in the figure are Snort® 510, Text 512, CoreImpact® 514 and CIPHER® 510, as example. Similarly, the yellow work block 502 accepts only filter pieces which can be seen when the yellow Filter tab is selected, the green work block 506 accepts only analysis modules which can be drag-n-drop into the block when the green Analysis tab is selected, and finally, the gray block 508 is for the visualization forms.

Figure 6:
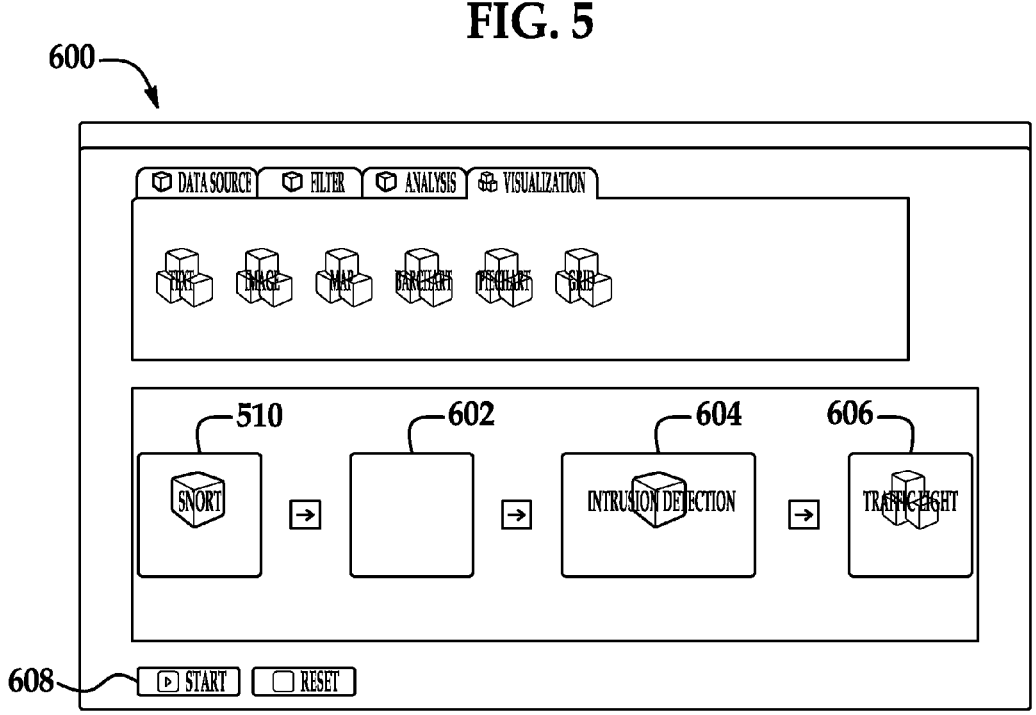
FIG. 6 is a workflow block diagram for highlighting SNORT® intrusion detection alerts.
Figure 7A:
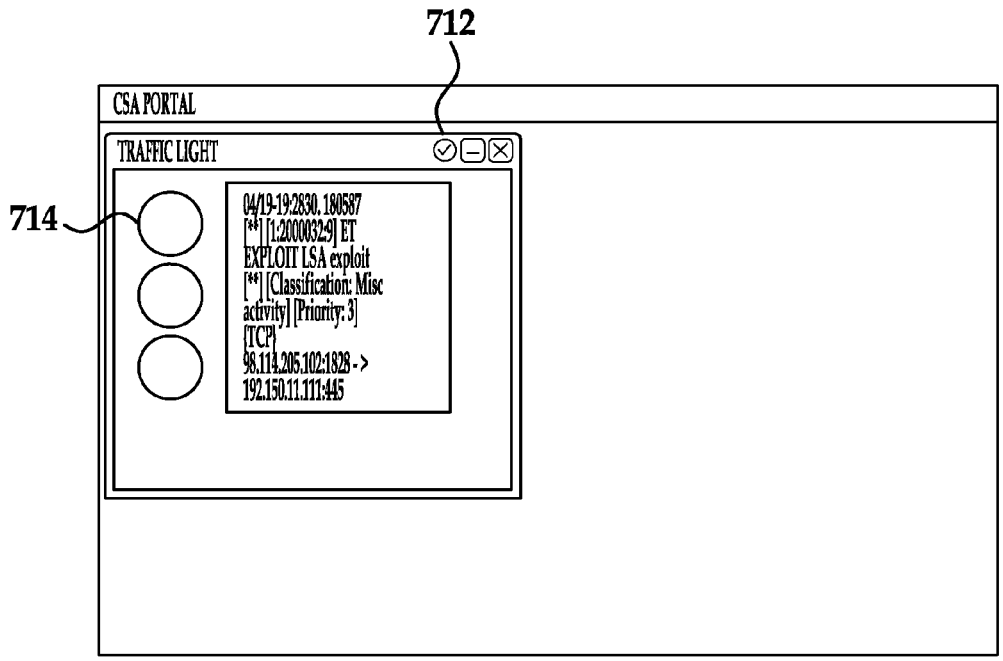
FIG. 7A is an example of a preview of SNORT® alert traffic light gadget.

An example workflow is shown in FIG. 6. In the figure, the workflow 600 defines a visual highlight of SNORT® alerts 510 with intrusion detection analysis 604. The needed work pieces and modules are selected and positioned into the corresponding work blocks. When the Start button 608 is clicked, a preview window FIG. 7A of the SNORT Alert Traffic Light gadget is brought up after the workflow is executed. To publish the gadget into repository for reuse and sharing, the user, simply clicks on the green checkmark icon 712 on the right top of the gadget preview window, a popup window 722 in FIG. 7B then appears and notifies the user that the gadget is published on Gadget Repository server at the given default URL. Note that the gadget publishing requires the authors to have proper permission for doing so to the Gadget Repository.

Figure 7B:
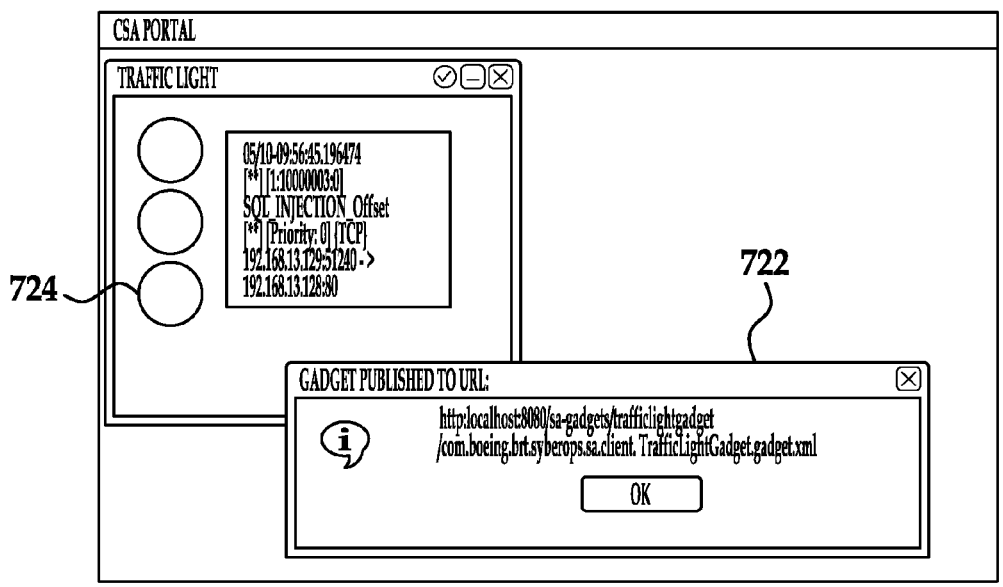
FIG. 7B is an example of gadget publishing from FIG. 7A.
Figure 8:
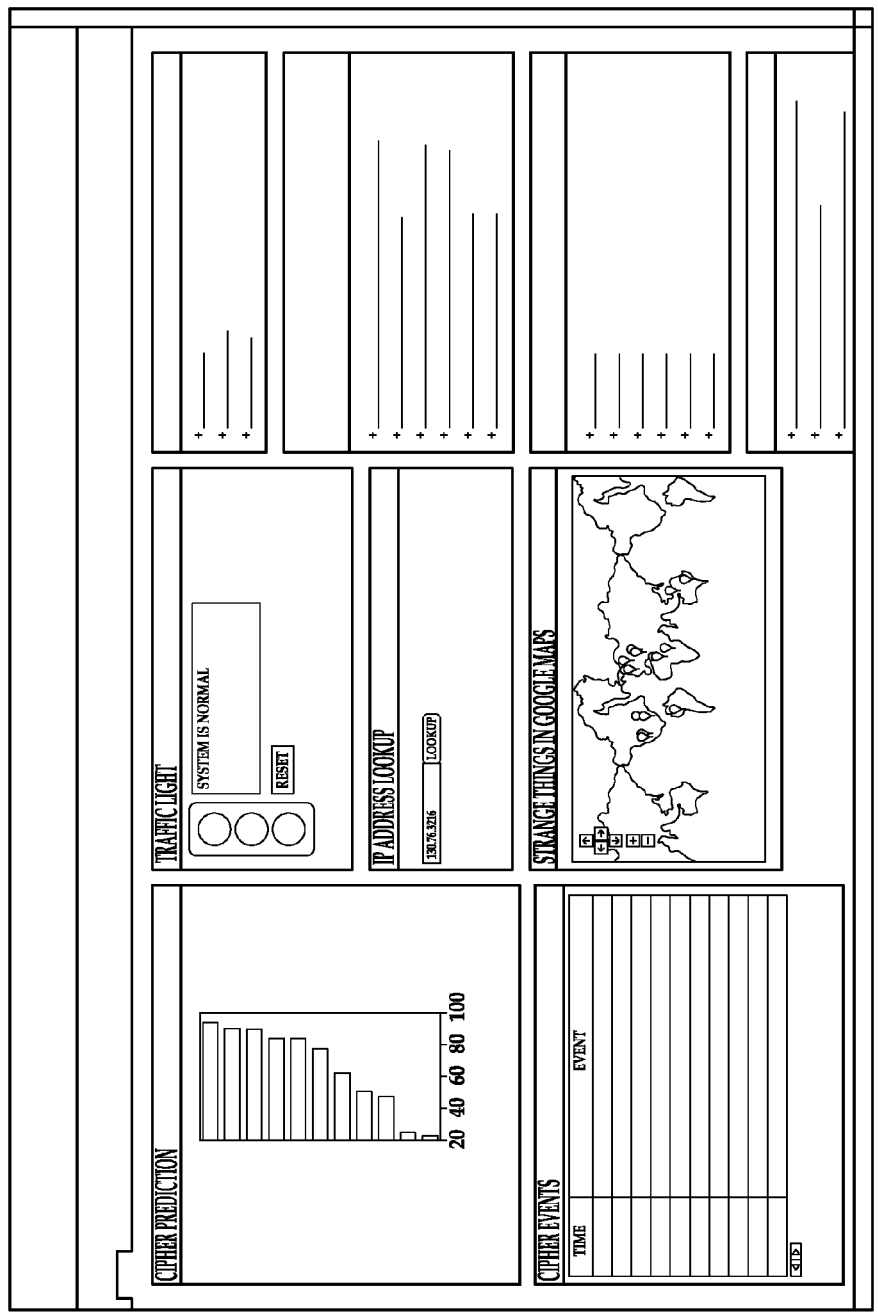
FIG. 8 is a sample screen shot of a CSA-board.

Once the gadget is published, it can be embedded into any web page to deliver dynamic content to end users. FIG. 8 shows an example CSA dashboard that includes the Traffic Light gadget we just created in the above described process. Unlike the previous two screenshots FIG. 7A, FIG. 7B, with one showing in red light 714 an ET Exploit with priority 3, and the other showing in green light 724 a SQL. Injection with priority 0, FIG. 7B shows in green light 802 a normal status of the monitored system. This is not surprising as the Traffic Light shows the real-time status of the monitored system reflected in SNORT® intrusion detection system and it changes dynamically over time.

As demonstrated above, the workbench simplifies the process of gadget publishing by using drag-n-drop user interaction interface and automatic generator of gadget description. The logic aspect of the workflows can be easily specified. However, it requires web service support of background analysis modules and visualizations to make it accessible to other users for gadget reuse and sharing purpose. The benefit of our workbench approach is not just the convenient way of creating gadget. It also makes it easier for knowledge retention as a gadget can be created once and reused for its lifetime, regardless where the gadget authors are and where the gadget repository is hosted.

What is claimed is:

1. A method, comprising:

displaying, via a processor, a gadget workbench using a first user interface, the gadget workbench including a first workflow block, a second workflow block, and a third workflow block of a workflow to be defined via the gadget workbench, and executed via a web gadget, the first workflow block, the second workflow block, and the third workflow block disposed on the gadget workbench in an execution sequence;

specifying a first data source from a plurality of data sources to be used to execute the workflow based on a first interaction with the first workflow block, the data sources being displayed in association with a first selectable tab associated with the first workflow block, in response to specifying the first data source, a remainder of the data sources not being specifiable;

specifying a first analysis module from a plurality of analysis modules to be used to execute the workflow based on a second interaction with the second workflow block, the first analysis module to obtain data from the first data source and process the data to generate an analysis of the data associated with the first data source, the analysis modules being displayed in association with a second selectable tab associated with the second workflow block, in response to specifying the first analysis module, a remainder of the analysis modules not being specifiable;

specifying a first visualization module from a plurality of visualization modules to be used to execute the workflow based on a third interaction with the third workflow block, the first visualization module to present the analysis, the visualization modules being displayed in association with a third selectable tab associated with the third workflow block, in response to specifying the first visualization module, a remainder of the visualization modules not being specifiable;

generating the web gadget based on the first data source, the first analysis module, and the first visualization module, the remainder of the data sources, the remainder of the analysis modules, and the remainder of the visualization modules not being used when generating the web gadget, the web gadget to dynamically provide a user with tailored content in accordance with the first data source, the first analysis module, and the first visualization module; and automatically generating a gadget description based on the workflow to prepare the web gadget for publishing, and displaying the gadget description, via a user interface, for user review, the gadget description illustrating the workflow including the specified first data source, the specified first analysis module, and the specified first visualization module.

2. The method of claim 1, wherein displaying the gadget workbench comprises displaying a first work piece and a second work piece.

3. The method of claim 2, wherein specifying the first data source comprises accepting the first work piece into the first workflow block via a drag-n-drop interaction.

4. The method of claim 1, wherein the gadget workbench includes a fourth workflow block and further comprising specifying a first filtering module to be used to execute the workflow based on a fourth interaction with the fourth workflow block, the first filtering module to filter the data.

5. The method of claim 4, wherein the first filtering module is selected from a plurality of filtering modules, the first filtering module including a geographic filter.

6. The method of claim 5, wherein, in response to specifying the first filtering module, a remainder of the filtering modules not being specifiable.

7. The method of claim 4, wherein the first filtering module filters the data prior to the first analysis module generating the analysis of the data.

8. The method of claim 1, further comprising publishing the web gadget to enable the web gadget to be embedded in a web page.

9. The method of claim 8, further comprising displaying a dashboard including the web gadget.

10. The method of claim 1, wherein generating the web gadget comprises accessing a web service application, the web service application comprising the analysis module.

11. The method of claim 1, wherein the first analysis module obtains data via a database query for one or more real-time events.

12. The method of claim 1, wherein the display includes at least one of a gauge view, a map view, or a chart view.

13. The method of claim 1, wherein the analysis modules and the visualization modules are not specifiable in association with the first workflow block.

14. The method of claim 1, further including a second user interface to display the web gadget.

15. The method of claim 14, wherein the first user interface and the second user interface are the same user interface.

16. The method of claim 14, wherein the first user interface is different from the second user interface, the first user interface displayable on a first device and the second user interface displayable on a second device.

17. The method of claim 1, wherein the web gadget is not to display the data sources displayed via the first user interface, the web gadget is not to display the analysis modules displayed via the first user interface, and the web gadget is not to display the visualization modules displayed via the first user interface.

18. The method of claim 1, wherein, in response to the generating of the web gadget, further including displaying the web gadget in a preview window, via a user interface, for user review prior to publication.

19. The method of claim 1, further including displaying a button on a user interface to enable web gadgets to be published to a gadget repository without receiving additional coding by a user, receiving a selection of the button, and in response to receiving the selection, publishing the web gadget to the gadget repository.

20. The method of claim 1, wherein the data sources are related to cyber security data and events.

21. A method, comprising:

accessing, via a processor, a gadget workbench using a first user interface, the gadget workbench including a workflow to be defined via the gadget workbench and executed by a web gadget, the workflow including workflow blocks disposed in an execution sequence on the gadget workbench;

interacting a first data source from a plurality of data sources with a first one of the workflow blocks, the data sources being displayed in association with a first selectable tab associated with the first one of the workflow blocks, in response to interacting the first data source, a remainder of the data sources not being interactable;

interacting an analysis module from a plurality of analysis modules with a second one of the workflow blocks, the analysis module to obtain data from the first data source and process the data to generate an analysis of the data associated with the first data source, the analysis modules being displayed in association with a second selectable tab associated with the second one of the workflow blocks, in response to interacting the first analysis module, a remainder of the analysis modules not being interactable;

interacting a visualization module from a plurality of visualization modules with a third one of the workflow blocks, the visualization modules being displayed in association with a third selectable tab associated with the third one of the workflow blocks, in response to interacting the first visualization module, a remainder of the visualization modules not being interactable;

generating the web gadget based on the first data source, the analysis module, and the visualization module, the web gadget to dynamically provide a user with tailored content via a second user interface in accordance with the first data source, the analysis module, and the visualization module; and automatically generating a gadget description based on the workflow to prepare the web gadget for publishing, and displaying the gadget description, via a user interface, for user review, the gadget description illustrating the workflow including the specified first data source, the specified first analysis module, and the specified first visualization module.

22. The method of claim 21, wherein interacting the first data source with the first one of the workflow blocks comprises interacting the first data source with the first one of the workflow blocks via a drag-n-drop interaction.

23. The method of claim 21, further comprising publishing the web gadget into a gadget repository.

24. The method of claim 23, further comprising embedding the web gadget into a web page.

25. The method of claim 21, further comprising interacting a filter work piece with the workflow.

26. A method, comprising:

displaying, via a processor, a gadget workbench via a first user interface, the gadget workbench including a plurality of data sources, a plurality of analysis modules, a plurality of visualization modules, and a workflow including a plurality of workflow blocks disposed in an execution sequence on the gadget workbench, wherein the data sources, the analysis modules, and the visualization modules are associated with respective selectable tabs; and generating a web gadget based on one of the data sources positioned on a first one of the workflow blocks, one of the analysis modules positioned on a second one of the workflow blocks, and one of the visualization modules positioned on a third one of the workflow blocks, the one of the analysis modules to obtain data from the one of the data sources and process the data to generate an analysis of the data associated with the one of the data sources, the one of the visualization modules to present the analysis, in response to the one of the data sources being positioned on the first one of the workflow blocks, a remainder of the data sources not being positionable on the workflow blocks, in response to the one of the analysis modules being positioned on the second one of the workflow blocks, a remainder of the analysis modules not being positionable on the workflow blocks, in response to the one of the visualization modules being positioned on the third one of the workflow blocks, a remainder of the visualization modules not being positionable on the workflow blocks, the web gadget to dynamically provide a user with tailored content via a second user interface in accordance with the one of the data sources, the one of the analysis modules, and the one of the visualization modules; and automatically generating a gadget description based on the workflow to prepare the web gadget for publishing, and displaying the gadget description for user review, the gadget description illustrating the workflow including the one of the data sources, the one of the analysis modules, and the one of the visualization modules.

27. The method of claim 26, wherein displaying the gadget workbench comprises displaying the workflow blocks in colors indicating types of modules positionable on the workflow blocks.

28. The method of claim 27, wherein generating the web gadget comprises accessing the one of the analysis modules through a web service.

29. The method of claim 26, further comprising publishing the web gadget in a gadget repository to enable the web gadget to be syndicated.

30. The method of claim 29, further comprising embedding the web gadget into a dashboard.

31. The method of claim 26, further comprising displaying a plurality of filter modules in the gadget workbench and generating the web gadget based on a filter module positioned on the workflow.

32. The method of claim 26, further comprising displaying a preview of the web gadget.

* * * * *